United States Patent
Liu et al.

(10) Patent No.: US 12,344,268 B2
(45) Date of Patent: Jul. 1, 2025

(54) Cro-IntentFormer-BASED METHOD AND SYSTEM FOR PREDICTING SURROUNDING VEHICLE TRAJECTORIES BY INTEGRATING DRIVING INTENTIONS

(71) Applicant: JIANGSU UNIVERSITY, Zhenjiang (CN)

(72) Inventors: Qingchao Liu, Zhenjiang (CN); Shiyu Li, Zhenjiang (CN); Yingfeng Cai, Zhenjiang (CN); Hai Wang, Zhenjiang (CN); Xiaoxia Xiong, Zhenjiang (CN); Long Chen, Zhenjiang (CN)

(73) Assignee: JIANGSU UNIVERSITY, Zhenjiang (CN)

( * ) Notice: Subject to any disclaimer, the term of this patent is extended or adjusted under 35 U.S.C. 154(b) by 0 days.

(21) Appl. No.: 18/858,350

(22) PCT Filed: May 28, 2024

(86) PCT No.: PCT/CN2024/095641
§ 371 (c)(1),
(2) Date: Dec. 26, 2024

(87) PCT Pub. No.: WO2025/077208
PCT Pub. Date: Apr. 17, 2025

(65) Prior Publication Data
US 2025/0128727 A1    Apr. 24, 2025

(30) Foreign Application Priority Data
Oct. 11, 2023   (CN) .......................... 202311313179.1

(51) Int. Cl.
*B60W 50/14*    (2020.01)
*B60W 50/00*    (2006.01)
*G06N 3/04*     (2023.01)

(52) U.S. Cl.
CPC ........ *B60W 50/14* (2013.01); *B60W 50/0097* (2013.01); *G06N 3/04* (2013.01);
(Continued)

(58) Field of Classification Search
CPC ............. B60W 50/14; B60W 50/0097; B60W 2050/146; B60W 2554/4041;
(Continued)

(56) References Cited

FOREIGN PATENT DOCUMENTS

| | | | |
|---|---|---|---|
| CN | 111046919 A | 4/2020 | |
| CN | 114368387 A | 4/2022 | |

(Continued)

OTHER PUBLICATIONS

Rulin Huang, Research on Key Technologies of Dynamic Obstacle Avoidance for Autonomous Vehicle, University of Science and Technology of China, 2017, pp. 1-98.
(Continued)

*Primary Examiner* — Nabil H Syed
*Assistant Examiner* — Cal J Eustaquio
(74) *Attorney, Agent, or Firm* — Bayramoglu Law Offices LLC

(57) ABSTRACT

The provided is a method and system for trajectory prediction based on Cro-IntentFormer. The method starts by preprocessing vehicle trajectory data collected by sensors to produce raw data suitable for model input. Vehicles are treated as nodes, and the distance between vehicles serves as the basis for determining whether there is an edge between two vehicle nodes. A physical relationship graph is constructed and, along with the raw data, input into a spatio-temporal feature extraction module to obtain the spatio-temporal features of the trajectory. The spatio-temporal feature matrix is then input into an intent prediction module to determine the predicted intentions of the vehicles. Based on the intent information output by the intent prediction
(Continued)

module, a semantic relationship graph is reconstructed and input, along with the raw data, into the spatio-temporal feature extraction module to derive the semantic features of the trajectory.

4 Claims, 4 Drawing Sheets

(52) U.S. Cl.
CPC .............. *B60W 2050/146* (2013.01); *B60W 2554/4041* (2020.02); *B60W 2554/4042* (2020.02); *B60W 2554/4045* (2020.02); *B60W 2554/80* (2020.02); *B60W 2556/10* (2020.02); *B60W 2556/35* (2020.02)

(58) Field of Classification Search
CPC . B60W 2554/4042; B60W 2554/4045; B60W 2554/80; B60W 2556/10; B60W 2556/35; G06N 3/04

See application file for complete search history.

(56) References Cited

FOREIGN PATENT DOCUMENTS

| | | |
|---|---|---|
| CN | 115158364 A | 10/2022 |
| CN | 115547040 A | 12/2022 |
| CN | 117351712 A | 1/2024 |
| KR | 20200133122 A | 11/2020 |

OTHER PUBLICATIONS

Daofei Li, et al., Vehicle trajectory prediction for automated driving based on temporal convolution networks, 2022 WRC Symposium on Advanced Robotics and Automation (WRC SARA), 2022, pp. 257-262, IEEE.

Cro-IntentFormer-BASED METHOD AND SYSTEM FOR PREDICTING SURROUNDING VEHICLE TRAJECTORIES BY INTEGRATING DRIVING INTENTIONS

CROSS-REFERENCE TO THE RELATED APPLICATIONS

This application is the national phase entry of International Application No. PCT/CN2024/095641, filed on May 28, 2024, which is based upon and claims priority to Chinese Patent Application No. 202311313179.1, filed on Oct. 11, 2023, the entire contents of which are incorporated herein by reference.

TECHNICAL FIELD

This application relates to the field of intelligent driving technologies, and specifically to a Cro-IntentFormer-based method and system for predicting surrounding vehicle trajectories by integrating driving intentions.

BACKGROUND

With the increasing number of autonomous vehicles in China, human-machine co-driving has become a trend in future transportation developments. In complex and variable traffic environments, it is crucial for autonomous vehicles to understand complex driving scenarios and predict the future intentions and trajectories of surrounding traffic participants to ensure safety. This capability also lays the foundation for downstream trajectory planning tasks in autonomous driving.

Current trajectory prediction methods typically only consider the influence of traffic participants within a certain distance of the target vehicle on its future trajectory. They often focus more on the distance between the target vehicle and surrounding vehicles during interaction modeling, neglecting potential factors such as the driving intentions of the vehicles, which can significantly impact the strength of interactions. As a result, these methods do not adequately capture the interactive features between the target vehicle and its surroundings. Moreover, current approaches usually separate the prediction of vehicle driving intentions from trajectory prediction and do not effectively integrate driving intention prediction into the trajectory prediction tasks. Additionally, most existing trajectory prediction methods apply attention mechanisms to individual time frames rather than to time slices, thus overlooking the connections between adjacent trajectory segments.

SUMMARY

The present disclosure provides a Cro-IntentFormer-based method and system for predicting surrounding vehicle trajectories by integrating driving intentions. This method explicitly considers the impact of driving intentions on future vehicle trajectories, incorporating both the distance between vehicles and the similarity of their behavioral intentions into the interaction modeling of vehicular relationships. It enables real-time prediction of surrounding vehicle trajectories during driving, offering strong support for safe navigation in complex and dynamic traffic environments, and providing a basis for downstream trajectory planning tasks.

A method for predicting surrounding vehicle trajectories based on Cro-IntentFormer and integrating vehicle driving intentions includes the following steps:

S1: preprocessing raw data obtained from vehicle trajectories collected by sensors;

S2: constructing a physical relationship graph with vehicles as nodes and the distances between vehicles as the basis for edges between two nodes, inputting the physical relationship graph along with the raw data into a spatio-temporal feature extraction module to obtain the spatio-temporal characteristics of the trajectory;

S3: inputting the spatio-temporal feature matrix into an intent prediction module to obtain the predicted intentions of the vehicles;

S4: reconstructing the semantic relationship graph based on the intent information output by the intent prediction module, and inputting the semantic relationship graph along with the raw data into the spatio-temporal feature extraction module to obtain the semantic features of the trajectory; and S5: integrating the spatio-temporal and semantic features of the trajectory and inputting them into a decoder to obtain the predicted trajectories of the vehicles surrounding the target vehicle.

Further, the step S1 of preprocessing the vehicle trajectories includes:

standardizing the trajectory data collected by onboard sensors, using timestamps and vehicle IDs to label the trajectory information;

cleaning the standardized trajectory data by removing anomalies and duplicates, filling missing values, and reducing noise in the cleaned data;

annotating trajectories with intentions based on the vehicle's heading angle and longitudinal/lateral speeds at each time step, where vehicle behavioral intentions include going straight $a_1$, changing lanes to the left $a_2$, and changing lanes to the right $a_3$; and dividing the processed trajectory data using a time window T, with the divided data serving as the raw input for the model.

Further, the constructing the physical relationship graph in the step S2 specifically includes:

selecting vehicles observed at time t as nodes $V_i$ for the graph;

setting a physical distance threshold D, and calculating the physical distance $d_{ij}$ between vehicles at time t. If $d_{ij}<D$, it is assumed that there is an edge $e_{ij}$ between nodes i and j, and a physical adjacency matrix $A_1$ is constructed based on the physical distances between vehicles; and establishing the physical relationship graph $G_1=\{V, E^1\}$ based on the connectivity relationships between nodes.

Further, the specific steps in the step S2, which involve inputting the physical relationship graph $G_1$ and the raw data into the spatio-temporal feature extraction module to obtain the spatio-temporal features of the trajectory, include:

sequentially inputting the raw data at time t, $H_t=\{h_t^1, h_t^2, \ldots, h_t^n\}$ into a temporal information fusion network to learn the time-dependency relationships of each vehicle's own trajectory, and outputs the feature-extracted matrix $B \in \mathbb{R}^{N \times L \times d_{model}}$.

where, $h_t^i=\{s_{t-T_h+1}^i, s_{t-T_h+2}^i, \ldots, s_t^i\}$ represents the historical state information for vehicle i, with $T_h$ being the preset historical time window and L being the number of time segments encoded by the network; and the state information of vehicle i at time t, $s_t^i=\{x_t^i, y_t^i,$ $a_t^i$, $\theta_t^i$, $v_t^i$}, consists of the vehicle's positional coordinates $x_t^i$, $y_t^i$, intent information at, heading angle $\theta_t^i$, and speed $v_t^i$; and after obtaining the feature matrix B, which integrates the time-dependency relationships of each vehicle's trajectory through the temporal information fusion network, re-establishing adjacency relationships for vehicle nodes within the physical relationship graph $G_1$ for each time segment; and performing attention operations on the feature matrix B among vehicles to learn the spatial relationships of the trajectories, to obtain the spatio-temporal feature matrix $Z^1 \in R^{N \times L \times dmodel}$ for all nodes in the physical relationship graph $G_1$.

Further, the computational process of the temporal information fusion network is as follows: dividing the historical state information h of each vehicle into time segments of length $L_{seg}$ along each feature dimension:

$$h_{1:T_h} = \{h_{i,c} | 1 \leq i \leq \frac{T_h}{L_{seg}}, 1 \leq c \leq c\}$$

$$h_{i,c} = \{h_{t,c} | (i-1) \times L_{seg} < t \leq i \times L_{seg}\}$$

$$h \in R^{T_h \times C}, h_{i,c} \in R^{1 \times L_{seg}}$$

where, C is the number of features in the original vehicle trajectory data, and $h_{i,c}$ represents the i-th time segment of length $L_{seg}$ for feature c;

using learnable linear matrices $E \in R^{dmodel \times L_{seg}}$ and $E_{i,c}^{(pos)} \in R^{dmodel}$ to perform feature embedding and positional encoding on the obtained time segments, to obtain the encoded feature vector $m_{i,c}$:

$$m_{i,c} = Eh_{i,c} + E_{i,c}^{(pos)}, m \in R^{L \times C \times dmodel}, L = \frac{T_h}{L_{seg}}$$

where, L is the total number of time segments after the historical time steps have been divided by $L_{seg}$; performing multi-head attention calculations and residual connections on the encoded feature vectors m along the time and feature dimensions, to obtain the feature matrix m_dim that integrates both the time segments and the input feature dimensions:

$m_{:,d}^{time}$=LayerNorm($m_{:,d}$+MSA$^{time}$($m_{:,d}, m_{:,d}, m_{:,d}$))

$m^{time}$=LayerNorm($n_{:,d}^{time}$+MLP($m_{:,d}^{time}$))

$m_{i,:}^{dim}$=LayerNorm($m_{i,:}^{time}$+MSA$^{dim}$($m_{i,:}^{time}, m_{i,:}^{time}, m_{i,:}^{time}$)( ))

$m^{dim}$=LayerNorm($m_{i,:}^{dim}$+MLP($m_{i,:}^{dim}$))

where, MSA(Q,K,V) denotes the multi-head attention operation, LayerNorm denotes layer normalization, and MLP denotes a multi-layer perceptron; $m_{i,2} \in R^{C \times dmodel}$ represents the feature matrix of all feature dimensions for time segment i, and $m_{2,c} \in R^{L \times dmodel}$ represents the feature matrix for feature dimension c across all time segments; and finally, aggregating the feature matrix $m^{dim} \in R^{L \times C \times dmodel}$, which integrates time segments and input feature dimensions through addition across the feature dimensions to obtain the feature matrix $B_i \in R^{L \times dmodel}$ that encapsulates the time-dependency relationships of vehicle is trajectory.

Further, the specific steps in the step S3 are as follows:
performing additive aggregation operations on the spatio-temporal feature matrix $Z^1 \in R^{N \times L \times dmodel}$ of all nodes in the physical relationship graph $G_1$ along the time dimension; and passing the aggregated spatio-temporal feature matrix through a fully connected network, and then normalize it using a Softmax function to obtain the predicted intent vector $w_i$={atten$_1$, atten$_2$, atten$_3$} for vehicle i; atten$_1$, atten$_2$, and atten$_3$ respectively represent the probabilities of the vehicle moving straight, changing lanes to the left, and changing lanes to the right.

Further, the specific steps in the step S4 for constructing the semantic relationship graph and obtaining the semantic features of the trajectory are:

selecting vehicles observed at time t as the nodes $V_i$ for the graph;

based on the predicted intent vector $\omega_i$ for vehicle i, selecting the behavior with the highest probability as the vehicle's future intent a;

explicitly considering the impact of the vehicle's driving intent on its future trajectory, and establish connections between nodes of vehicles with the same intent to obtain the semantic adjacency matrix $A_2$;

constructing the semantic relationship graph $G_2$={V, $E^2$} based on the connectivity relationships between nodes; and inputting both the semantic relationship graph $G_2$ and the raw data obtained in the step S1 into the spatio-temporal feature extraction module, to derive the semantic feature matrix $Z^2 \in R^{N \times L \times dmodel}$ for all nodes in the semantic relationship graph $G_2$.

Further, the specific steps in the step S5 are as follows:
obtaining the importance $w_1$ and $w_2$ of the spatio-temporal and semantic features for all vehicle nodes:

$$w_1 = \frac{1}{|V|} \sum_{i \in V} q^T \cdot \tanh(W \cdot Z_i^1 + b), w_2 = \frac{1}{|V|} \sum_{i \in V} q^T \cdot \tanh(W \cdot Z_i^2 + b)$$

where, q represents a learnable semantic-level attention vector, and tanh denotes the hyperbolic tangent activation function;

normalizing the importance $w_1$ and $w_2$ of the spatio-temporal and semantic features for all vehicle nodes to obtain the feature weights $\beta_i$ of the spatio-temporal and semantic features:

$$\beta_i = \frac{w_i}{w_1 + w_2}$$

performing weighted summation of the spatio-temporal and semantic features to obtain the feature matrix J that integrates both spatio-temporal and semantic information:

$J = \beta_1 Z^1 + \beta_2 Z^2$; and inputting the feature matrix J into a decoder to produce the predicted trajectories F={$f_1, f_2, \ldots, f_n$} for the vehicles surrounding the target vehicle, where $f_i = (X_{t+1}^i, Y_{t+1}^i)$, $(x_{t+2}^i, Y_{t+2}^i), \ldots, (x_{t+T_f}^i, Y_{t+T_f}^i)$ represents the future trajectory of vehicle i, and $T_f$ represents the preset future time window.

A prediction system for the Cro-IntentFormer-based method of integrating vehicle driving intentions for predicting surrounding vehicle trajectories includes:

- an information collection and processing device, including onboard sensors, roadside sensors, and a data processing module, configured for real-time acquisition of the position and speed information of the ego vehicle and surrounding vehicles, and for standardizing, cleaning, and preprocessing the collected data to meet the input requirements of the surrounding vehicle trajectory prediction model; and
- a surrounding vehicle trajectory prediction model, including a spatio-temporal feature extraction module, an intent prediction module, a feature fusion module, and a decoder, where during vehicle operation, the surrounding vehicle trajectory prediction model explicitly considers the impact of vehicle driving intentions on future trajectories, and predicts the future trajectories of surrounding vehicles based on the raw data obtained from the information collection and processing device.

Furthermore, the prediction system also includes a hazard warning device that uses the future trajectories predicted by the surrounding vehicle trajectory prediction model to issue warnings for vehicles that may pose a collision risk with the ego vehicle's future path.

The present disclosure proposes a method and system for predicting surrounding vehicle trajectories based on Cro-IntentFormer, which incorporates vehicle driving intentions. The system utilizes the CrossFormer model to extract temporal features of vehicle trajectories. CrossFormer is a neural network model based on the attention mechanism that effectively captures dependencies across time segments and input feature dimensions, thus fully learning the information between adjacent trajectory segments. The system explicitly considers the impact of vehicle driving intentions on future vehicle trajectories, incorporating both the distance between vehicles and the similarity of their behavioral intentions into the interactive modeling of vehicular relationships, enhancing the model's interpretability and prediction accuracy, and providing strong support for safe driving in complex and variable traffic environments.

Advantages of the present disclosure include:
(1) Proposing a method for predicting surrounding vehicle trajectories that explicitly considers vehicle driving intentions, integrating both the distance and behavioral intentions between vehicles into the interactive modeling of vehicular relationships. This method delves deeply into the similarity of trajectories between vehicles with similar intentions and couples the prediction of vehicle driving intentions with trajectory prediction, enhancing the model's prediction accuracy.
(2) Using the CrossFormer network as the temporal information fusion network to extract the temporal dependencies of vehicle trajectories. This network's mechanism for dividing time segments fully learns the information between adjacent trajectory segments. Attention operations are then performed on vehicle trajectories within each time segment to learn the spatial relationships of the trajectories. This application layers the extraction of spatio-temporal features of vehicle trajectories, making fuller use of the data and enhancing the model's interpretability.

DETAILED DESCRIPTION OF THE EMBODIMENTS

The present disclosure will be further described below with reference to the drawings and specific embodiments, although the scope of protection of the present disclosure is not limited thereto.

Figures 1, 2:
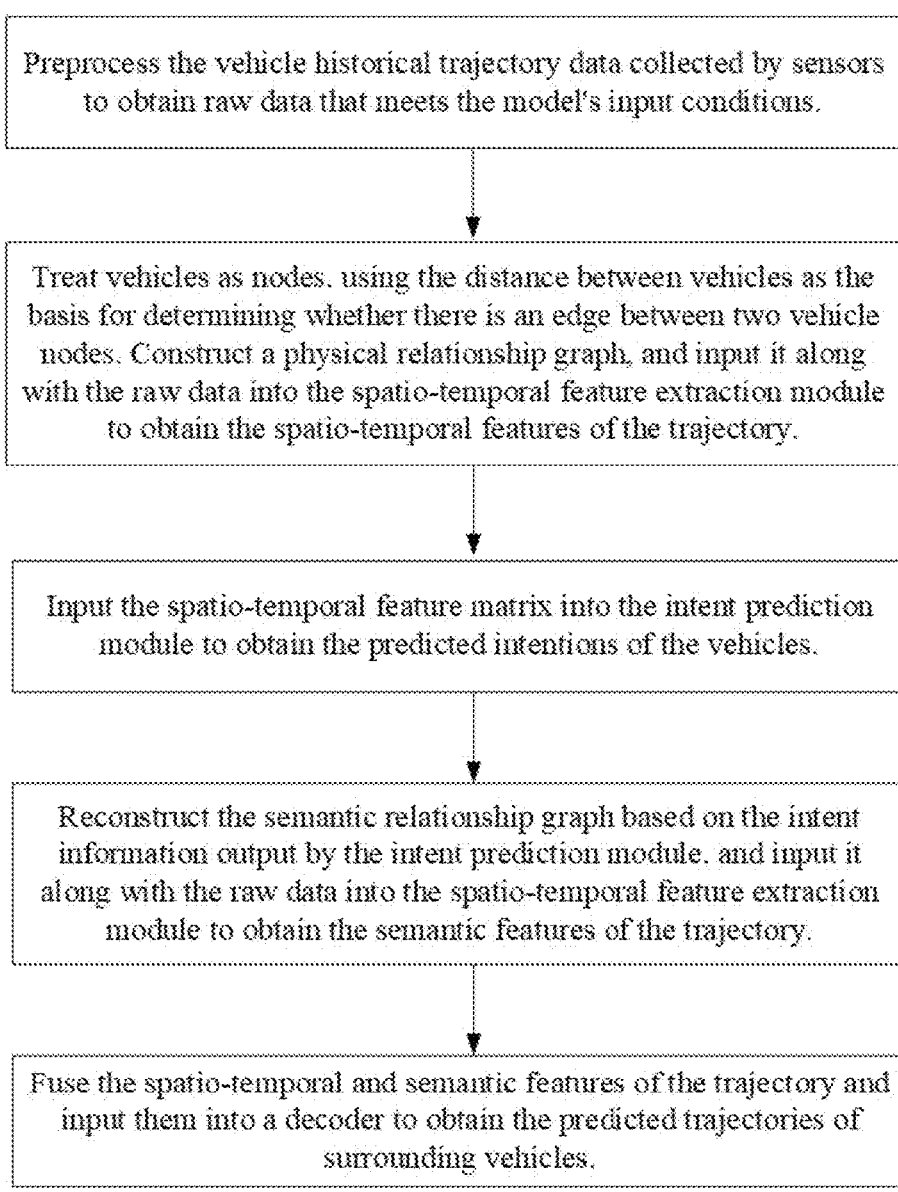
FIG. 1 is a block diagram of the surrounding vehicle trajectory prediction system based on Cro-IntentFormer incorporating vehicle driving intentions, as described in the present disclosure.
FIG. 2 is a flowchart illustrating the method for predicting surrounding vehicle trajectories based on Cro-IntentFormer incorporating vehicle driving intentions, as described in the present disclosure.

As shown in FIG. 1, the surrounding vehicle trajectory prediction system based on Cro-IntentFormer integrating vehicle driving intentions described in the present disclosure includes an information collection and processing device, a surrounding vehicle trajectory prediction device, and a hazard warning device.

The information collection and processing device includes onboard sensors, roadside sensors, and a data processing module. It is configured for real-time acquisition of position and speed information of the ego vehicle and surrounding vehicles, identifying trajectory information with timestamps and vehicle IDs, and performing standardization, cleaning, and preprocessing of the trajectory data. This includes removing outliers and duplicate data, filling missing values, and reducing noise. Afterwards, the trajectories are annotated with intentions based on the vehicle's heading angle and longitudinal/lateral speed at each time step. The behavioral intentions of vehicles include going straight $a_1$, changing lanes to the left $a_2$, and changing lanes to the right $a_3$. Finally, the processed trajectory data is divided using a time window T to obtain raw data suitable for input into the surrounding vehicle trajectory prediction model.

The surrounding vehicle trajectory prediction device includes a spatio-temporal feature extraction module, an intent prediction module, a feature fusion module, and a decoder. During vehicle operation, it explicitly considers the impact of vehicle driving intentions on future vehicle trajectories, predicts the future trajectories of surrounding vehicles based on the raw data obtained from the information collection and processing device, and displays the prediction results on the vehicle's central control screen.

The hazard warning device, based on the future trajectories predicted by the surrounding vehicle trajectory prediction model, issues warnings for vehicles that may pose a collision risk with the ego vehicle's future path, providing reference for human drivers and serving as a basis for downstream trajectory planning tasks.

As shown in FIG. 2, the method for predicting surrounding vehicle trajectories based on Cro-IntentFormer integrating vehicle driving intentions described in the present disclosure proceeds as follows:

S1: Preprocess vehicle trajectory data collected by sensors to obtain raw data suitable for model input;

S2: Construct a physical relationship graph with vehicles as nodes and the distance between vehicles as the basis for edges between two vehicle nodes, and input the physical relationship graph along with raw data into the spatio-temporal feature extraction module to obtain the spatio-temporal features of the trajectory;

S3: Input the spatio-temporal feature matrix into the intent prediction module to obtain the predicted vehicle intentions;

S4: Reconstruct the semantic relationship graph based on the intent information output by the intent prediction module, and input the semantic relationship graph along with the raw data into the spatio-temporal feature extraction module to obtain the semantic features of the trajectory;

S5: Fuse the spatio-temporal and semantic features of the trajectory and input them into the decoder to obtain the predicted trajectories of vehicles surrounding the target vehicle.

The CrossFormer network, a neural network model based on the attention mechanism, effectively captures dependencies across time segments and input feature dimensions, fully learning the dependencies between adjacent trajectory segments. The present disclosure employs it as the trajectory time information fusion network. After using this network to learn the temporal dependencies of vehicle trajectories, attention operations are performed on vehicle trajectories within each time segment to learn the spatial dependencies. The present disclosure layers the extraction of spatio-temporal features of vehicle trajectories, maximizing the interpretability of the model.

Figure 3:
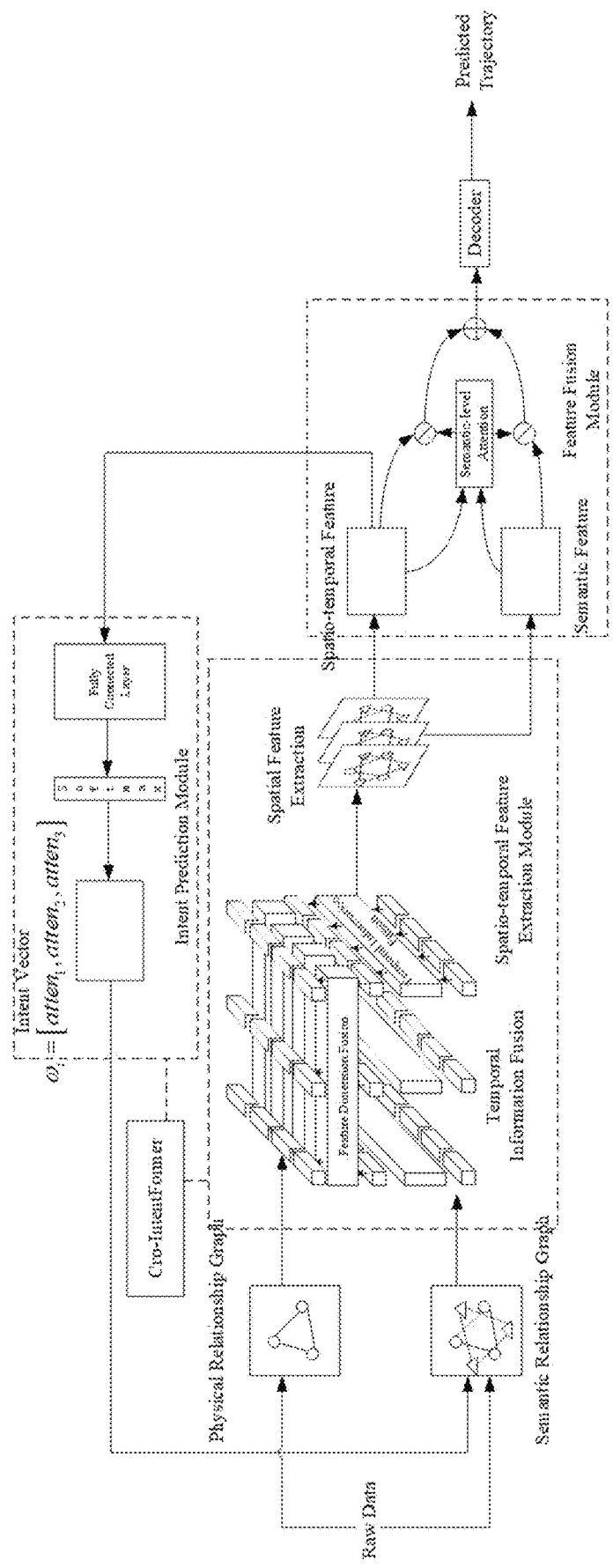
FIG. 3 is an architectural diagram of the surrounding vehicle trajectory prediction model.

Specifically, referring to the architectural diagram of the surrounding vehicle trajectory prediction model shown in FIG. 3, the raw data preprocessed by the information collection and processing device is input into the said surrounding vehicle trajectory prediction model for the following predictive processing:

S2.1 Construction of the Physical Relationship Graph $G_1$.

Select vehicles observed at time t as the nodes $V_i$ of the graph. Based on a preset physical distance threshold D, calculate the physical distance $d_{ij}$ between vehicles at time t. If $d_{ij}<D$, it is considered that there is an edge $e_q$ between nodes i and j, and a physical adjacency matrix $A_1$ is established based on the physical distances between vehicles. The physical relationship graph $G_1=\{V, E'\}$ is then constructed based on the connectivity relationships between nodes.

S2.2 Inputting the Physical Relationship Graph $G_1$ and Raw Data into the Spatio-Temporal Feature Extraction Module to Obtain the Spatio-Temporal Features of the Trajectory.

Sequentially input the raw data $H_t=\{h_t^1, h_t^2, \ldots, h_t^n\}$ at time t of vehicles in the node set of the physical relationship graph $G_1$ into the temporal information fusion network to learn the time dependency relationships of each vehicle's own trajectory and output the feature-extracted matrix B $\in R^{N \times L \times dmodel}$. Here, $h_t^i=\{s_{t-T_h+1}^i, s_{t-T_h+2}^i, \ldots, s_t^i\}$ represents the historical state information for vehicle i, with $T_h$ being the preset historical time window. The state information of vehicle i at time t, $s_t^i=\{x_t^i, y_t^i, a_t^i, \theta_t^i, v_t^i\}$, consists of the vehicle's positional coordinates $x_t^i$, $y_t^i$, intent information at, heading angle $\theta_t^i$, and speed $v_t^i$;

The computational method for using the temporal information fusion network to learn the time dependency relationships of each vehicle's own trajectory is as follows:

Divide the historical state information h of each vehicle into time segments of length $L_{seg}$ for each feature dimension:

$$h_{1:T_h} = \{h_{i,c} | 1 \le i \le \frac{T_h}{L_{seg}}, 1 \le c \le c\}$$

-continued
$$h_{i,c} = \{h_{t,c} | (i-1) \times L_{seg} < t \le i \times L_{seg}\}$$

$$h \in R^{T_h \times C}, h_{i,c} \in R^{1 \times L_{seg}}$$

Where, C is the number of features in the original vehicle trajectory data, and $h_{i,c}$ represents the i-th time segment of length $L_{seg}$ for feature c. Use learnable linear matrices E $\in R^{dmodel \times L_{seg}}$ and $E_{i,c}^{(pos)} \in R^{dmodel}$ to perform feature embedding and positional encoding on the obtained time segments, to obtain the encoded feature vector $m_{i,c}$:

$$m_{i,c} = Eh_{i,c} + E_{i,c}^{(pos)}, m \in R^{L \times C \times dmodel}, L = \frac{T_h}{L_{seg}}$$

Where, L is the total number of time segments after the historical time steps have been divided by $L_{seg}$.

Perform multi-head attention calculations and residual connections on the encoded feature vectors m along the time and feature dimensions, to obtain the feature matrix $m^{dim} \in R^{L \times C \times dmodel}$ that integrates both the time segments and the input feature dimensions:

$m_{:,d}^{time}$=LayerNorm($m_{:,d}$+MSA$^{time}$($m_{:,d},m_{:,d},m_{:,d}$))

$m^{time}$=LayerNorm($m_{:,d}^{time}$+MLP($m_{:,d}^{time}$))

$m_{i,:}^{dim}$=LayerNorm($m_{i,:}^{time}$+MSA$^{dim}$($m_{i,:}^{time},m_{i,:}^{time}$, $m_{i,:}^{time}$)( ))

$m^{dim}$=LayerNorm($m_{i,:}^{dim}$+MLP($m_{i,:}^{dim}$))

Where, MSA(Q,K,V) denotes the multi-head attention operation, LayerNorm denotes layer normalization, and MLP denotes a multi-layer perceptron; $m_{i,2} \in R^{C \times dmodel}$ represents the feature matrix of all feature dimensions for time segment i, and $m_{2,c} \in R^{L \times dmodel}$ represents the feature matrix for feature dimension c across all time segments.

Finally, perform an additive aggregation operation on the feature matrix $m^{dim} \in R^{L \times C \times dmodel}$ along the feature dimension to obtain the feature matrix $B_i \in R^{L \times dmodel}$ that encapsulates the time-dependency relationships of vehicle is trajectory.

After obtaining the feature matrix $B \in R^{N \times L \times dmodel}$, which integrates the time-dependency relationships of each vehicle's trajectory through the temporal information fusion network, adjacency relationships are re-established based on the physical distances between vehicles at the last time step within each time segment, to obtain a physical relationship graph $G^{time}=\{G^{l_1}, G^{l_2}, \ldots G^{l_L}\}$ for each time segment, where $G^{l_i}$ is the physical relationship graph between vehicles for the i-th time segment. Attention operations are then performed on vehicle trajectories within each time segment based on the adjacency relationships of the physical relationship graph $G^{l_i}$ and the feature matrix B, to learn the spatial dependencies of the trajectories. Finally, the results calculated within each time segment are stacked along the time dimension to obtain the spatio-temporal feature matrix $Z^1 \in R^{N \times L \times dmodel}$ for all nodes in the physical relationship graph $G_1$.

S3: Input the spatio-temporal feature matrix into the intent prediction module to obtain the vehicle's predicted intent.

Aggregate the spatio-temporal feature matrix $Z^1 \in R^{N \times L \times dmodel}$ of all nodes in the physical relationship graph $G_1$ along the time dimension using additive operations. After the additive aggregation, pass the resulting spatio-temporal feature matrix through a fully connected network and normalize it using the Softmax function to obtain the predicted intent vector $\omega_i=\{atten_1, atten_2, atten_3\}$ for vehicle i. Here, $atten_1$, $atten_2$, and $atten_3$ respectively represent the probabilities of the vehicle moving straight, changing lanes to the left, and changing lanes to the right.

Step S4.1 Construct the Semantic Relationship Graph: The present disclosure explicitly considers the impact of vehicle driving intentions on future vehicle trajectories, integrating both the distance between vehicles and the similarity of their behavioral intentions into the interactive modeling of vehicular relationships, and coupling the prediction of vehicle driving intentions with trajectory prediction. Select vehicles observed at time t as the nodes $V_i$ for the graph. Based on the predicted intent vector $\omega_i$ for vehicle i, select the behavior with the highest probability as the future intent a of the vehicle, establish connections between nodes of vehicles with the same intent, and construct the semantic relationship graph $G_2=\{V, E^2\}$ based on the connectivity relationships between nodes.

Step S4.2 Obtain the Semantic Features of the Trajectory: Input both the semantic relationship graph $G_2$ and the raw data obtained in step S1 into the spatio-temporal feature extraction module to derive the semantic feature matrix $Z^2 \in R^{N \times L \times dmodel}$ for all nodes in the semantic relationship graph $G_2$.

S5.1 Fusion of Spatio-Temporal and Semantic Features: Obtain the importance of the spatio-temporal and semantic features for all vehicle nodes, denoted as $w_1$ and $w_2$, respectively:

$$w_1 = \frac{1}{|V|}\sum_{i \in V} q^T \cdot \tanh(W \cdot Z_i^1 + b), \quad w_2 = \frac{1}{|V|}\sum_{i \in V} q^T \cdot \tanh(W \cdot Z_i^2 + b)$$

Where, q represents a learnable semantic-level attention vector, and tanh represents the hyperbolic tangent activation function;

Normalize the importance $w_1$ and $w_2$ of the spatio-temporal and semantic features for all vehicle nodes to obtain the feature weights $\beta_i$ for the trajectory's spatio-temporal and semantic features:

$$\beta_i = \frac{w_i}{w_1 + w_2}$$

Perform a weighted summation of the spatio-temporal and semantic features to obtain the feature matrix J, which integrates the spatio-temporal and semantic information of the trajectory:

$$J = \beta_1 Z^1 + \beta_2 Z^2$$

S5.2 Decoding to Obtain the Predicted Trajectories of Vehicles Surrounding the Target Vehicle: Input the feature matrix J into the decoder to obtain the predicted trajectories $F=\{f_1, f_2, \ldots, f_n\}$ for vehicles surrounding the target vehicle, where $f_i=\{(x_{t+1}^i, y_{t+1}^i), (x_{t+2}^i, Y_{t+2}^i), \ldots, (x_{t+T_f}^i, y_{t+T_f}^i)\}$ represents the future trajectory of vehicle i, and $T_f$ represents the preset future time window.

Figure 4:
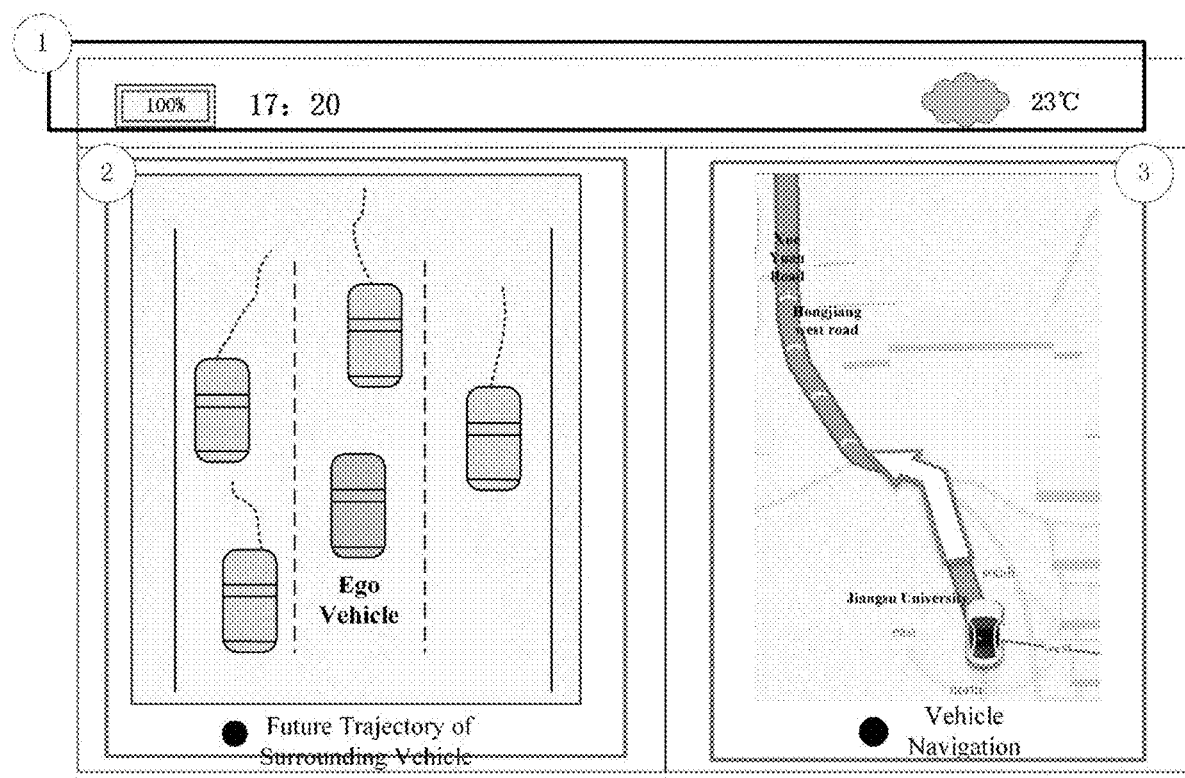
FIG. 4 is a display diagram of the "Surrounding Vehicle Trajectory" interface of the trajectory prediction system described in the present disclosure.

FIG. 4 is an exemplary diagram of the "Surrounding Vehicle Trajectory" interface displayed by the surrounding vehicle trajectory prediction system described in the present disclosure. The display interface consists of three sections: Frame ① displays the current time, weather conditions and temperature in the vehicle's location city, as well as the remaining battery percentage; Frame ② displays real-time images of the host vehicle and surrounding vehicles at the current moment along with the future trajectories of surrounding vehicles predicted by the surrounding vehicle trajectory prediction system. To distinguish between the host vehicle and surrounding vehicles, vehicles in the scene are marked in orange and gray, respectively, and the future trajectories of surrounding vehicles under safe conditions are shown with green dashed lines; Frame ③ displays real-time navigation for the vehicle at the current moment.

Figure 5:
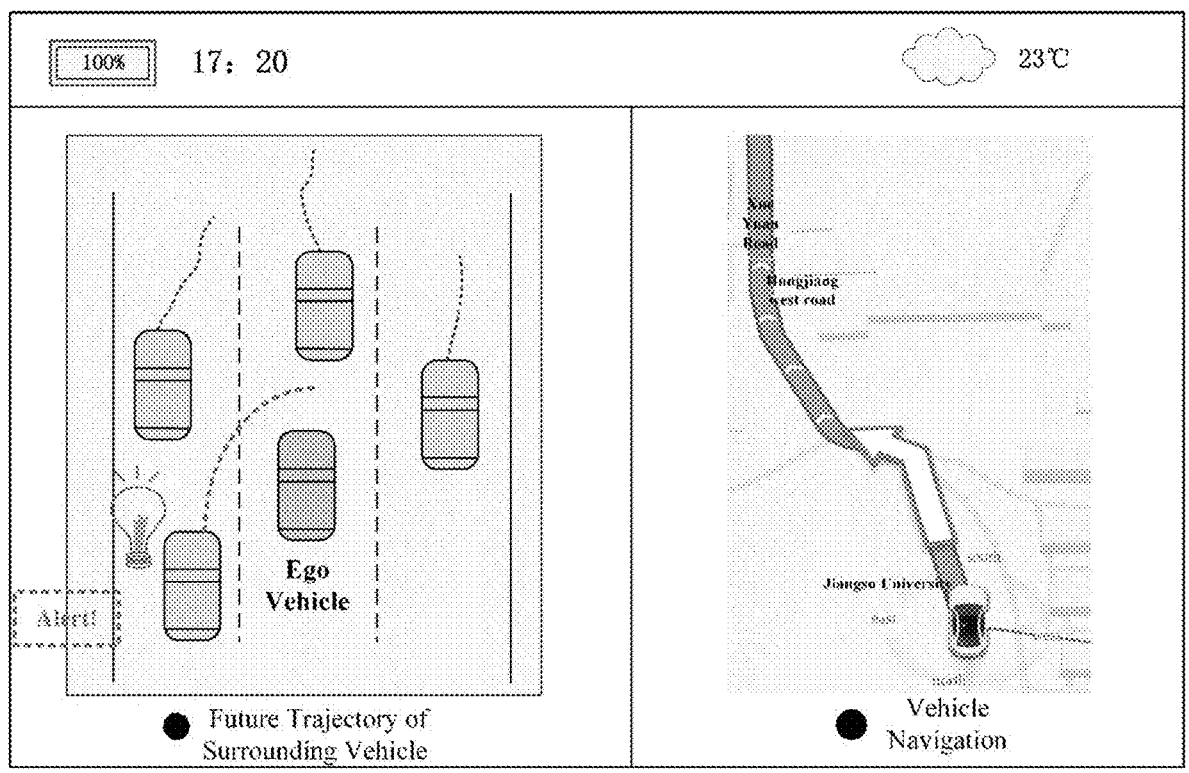
FIG. 5 is a display diagram of the "Hazard Warning" interface of the surrounding vehicle trajectory prediction system described in the present disclosure.

FIG. 5 is an exemplary diagram of the "Hazard Warning" interface displayed by the surrounding vehicle trajectory prediction system described in the present disclosure. When the future trajectories obtained by the surrounding vehicle trajectory prediction system may pose a collision risk with the host vehicle's path, the future trajectory of the respective risk vehicle changes from green to red, and a red light alert and a danger popup are displayed next to the said risk vehicle.

The descriptions provided above are merely specific explanations of feasible implementations for this application and do not limit the scope of this application. Any obvious improvements, substitutions, or variations that can be made by those skilled in the art without deviating from the substantive content of the present disclosure are within the scope of protection of the present disclosure.

What is claimed is:

1. A Cro-IntentFormer-based method for predicting surrounding vehicle trajectories by integrating driving intentions, characterized by comprising the following steps:

in S1, preprocessing vehicle trajectory data collected by sensors to obtain raw data;

in S2, L treating vehicles as nodes, using a distance between the vehicles as a basis for determining whether there is an edge between two vehicle nodes, constructing a physical relationship graph, and inputting the physical relationship graph along with the raw data into a spatio-temporal feature extraction module to obtain spatio-temporal features of a trajectory;

wherein the constructing the physical relationship graph in the step S2 comprises:

selecting vehicles observed at time t as nodes $V_1$ for the graph; and setting a physical distance threshold D, calculating a physical distance $d_{ij}$ between the vehicles at time t, wherein when $d_{ij} < D$, it is considered that there is an edge $e_{ij}$ between nodes land j, and a physical adjacency matrix $A_1$, i is established based on the physical distances between the vehicles:

constructing the physical relationship graph $G_1=\{V.E^1\}$ based on connectivity relationships between the nodes:

wherein the obtaining the spatio-temporal features of the trajectory by inputting the physical relationship graph G, and the raw data into the spatio-temporal feature extraction module in step S2 comprises:

sequentially inputting the raw data $H_t = \{h^1/_t, h^2/_t, \ldots h^n/_t\}$ at time t into a temporal information fusion network to learn time-dependency relationships of each vehicle's own trajectory and output a feature-extracted matrix $B \in R^{N \times L \times dmodel}$;

wherein $h^i_t = \{S^i/_{t-T^{h+1}} - S_{t-T^{h+1Th+2}} \ldots S^i/_t\}$ represents historical state information for vehicle i, $T_h$, is a preset historical time window, and L is the number of time segments encoded by the network;

state information of the vehicle i at time t, $S^i/_t = \{x^i/_t, y^i/_t, a^i/_t, \theta^i/_t, v^i/_t\}$, comprises vehicle's positional coordinates $x^i/_t$, $y^i/_t$, intent information $a^i/_t$, heading angle $\theta^i/_t$ and speed $v^i/_t$; and after obtaining a feature matrix B, which integrates the time-dependency relationships of each vehicle's trajectory through the temporal information fusion network, reestablishing adjacency relationships for vehicle nodes within each time segment of the physical relationship graph $G_1$, and performing attention operations on the feature matrix B among the vehicles to learn spatial relationships of the trajectories, to obtain the spatio-temporal feature matrix $Z^1 \in R^{N \times L \times dmodel}$ for all nodes in the physical relationship graph $G_1$;

wherein a computational process of the temporal information fusion network comprises:

dividing the historical state information of each vehicle into time segments of length $L_{seg}$ for each feature dimension:

$$h_{1:Th} = \{h_{1,c} \mid 1 \leq i \leq T_h/L_{seg}, 1 \leq C \leq 1\}$$

$$h_{1,c} = \{h_{t,c} \mid (i-1) \times L_{seg} < t \leq i \times L_{seg}\}$$

$$h \in R^{T_h \times c}, h_{1,c} \in R^{1 \times L_{seg}}$$

wherein C is the number of features in original vehicle trajectory data, and $h_1$, is an i-th time segment of length $L_{seg}$ for feature c;

using learnable linear matrices $E \in R^{dmodel \times L_{seg}}$ and $E_{i,c}^{(pos)} \in R^{dmodel}$ to perform feature embedding and positional encoding on the obtained time segments, to obtain the encoded feature vector $m_{i,c}$;

$$M_{i,c} = E h_{i,c} + E_{i,c}^{(pos)}, m \in R^{L \times C \times dmodel}, L = T_h/L_{seg}$$

wherein L is the number of time segments encoded by the network, namely a total number of time segments after historical time steps have been divided by $L_{seg}$;

performing multihead attention calculations and residual connections on the encoded feature vectors m along time and feature dimensions, to obtain a feature matrix $$m_{i,c} \in R^{L \times dmodel}$$

that integrates both the time segments and the input feature dimensions:

$$m^{time}_{:,d} = \text{Layernorm}(m_d + MSA^{time}(m_{:,d}, m_{:,d}, m_{:,d}))$$

$$m^{time} = \text{Layernorm}(m^{time}(\wedge M^{time}_{:,d} + MLP(\wedge m^{time}_{:,d}))$$

$$m^{dim} = \text{Layernorm}(m^{time}_{i,:}(\wedge m^{time}_{:,d} + MSA^{dim}(m^{time}_{1,:}, m^{time}_{1,:}, m^{time}_{1,:})()))$$

$$m^{dim} = \text{Layernorm}(m^{dim}_{i,:} + MLP(m^{dim}_{i,:}))$$

wherein MSA(Q,K,V) represents a multi-head attention operation, LayerNorm denotes layer normalization, and MLP denotes a multi-layer perceptron;

$$m_{i,:} \in R^{C \times dmodel}$$

represents a feature matrix of all feature dimensions for a time segment i, and $$m_{:,c} \in R^{L \times dmodel}$$

represents a feature matrix for feature dimension C across all time segments; and performing an additive aggregation operation on the feature matrix $$m^{dim} \in R^{L \times dmodel}$$

along the feature dimension to obtain a feature matrix $B_i \in R^{L \times dmodel}$ that encapsulates the time-dependency relationships of vehicle l's trajectory:

in S3, inputting the spatio-temporal feature matrix into an intent prediction module to obtain predicted intentions of the vehicles, comprising:

performing additive aggregation operations on the spatio-temporal feature matrix $$Z^1 \in R^{N \times L \times dmodel}$$

of all nodes in the physical relationship graph $G_1$, along a time dimension; and after an additive aggregation, passing the spatio-temporal feature matrix through a fully connected network and normalizing the spatio-temporal feature matrix using a Softmax function to obtain a predicted intent vector $$\omega_i = \{atten_1, atten_2, atten_3\}$$

for the vehicle i; $atten_1$, $atten_2$, and $atten_3$ respectively represent probabilities that the vehicle goes straight, changes lanes to a left, and changes the lanes to a right;

in S4, reconstructing a semantic relationship graph based on the intent information output by the intent prediction module, and inputting the semantic relationship graph along with the raw data into the spatio-temporal feature extraction module to obtain semantic features of the trajectory:

wherein steps of the step S4 for constructing the semantic relationship graph and obtaining the semantic features of the trajectory are as follows:

selecting the vehicles observed at time t as the nodes $V_i$, for the graph;

based on the predicted intent vector $\omega_i$, for the vehicle $V_i$, selecting a behavior with a highest probability as a future intent a for the vehicle, explicitly considering an impact of vehicle driving intentions on future vehicle trajectories, establishing connections between nodes of vehicles with an identical intent, and obtaining a semantic adjacency matrix $A_2$;

constructing the semantic relationship graph $G^2 = \{V.E^2\}$ based on the connectivity relationships between the nodes; and inputting both the semantic relationship graph $G^2$ and the raw data obtained in step S1 into the spatio-temporal feature extraction module to derive a semantic feature matrix $$Z^2 \in R^{N \times L \times dmodel}$$

for all nodes in the semantic relationship graph $G_2$; and in S5, fusing spatio-temporal and semantic features of the trajectory and inputting them the spatiotemporal and semantic features of the trajectory into a decoder to obtain predicted trajectories of vehicles surrounding a target vehicle, comprising:

obtaining an importance of the spatio-temporal and semantic features for all vehicle nodes, denoted as $w_1$ and $w_2$, respectively:

$$w_1 = 1/|V| \Sigma_{i \in V} q^T * \tanh(W * Z1/i + b), w_2 = 1/|V| \Sigma_{i \in V} q^T * \tanh(W * Z2/i + b)$$

wherein q represents a learnable semantic-level attention vector, and tanh represents a hyperbolic tangent activation function;

normalizing the importance $w_1$ and $w_2$ of the spatio-temporal and semantic features for all vehicle nodes to obtain feature weights βi for trajectory's spatio-temporal and semantic features:

$$\beta i = w_1/w_1+w_2$$

performing a weighted summation of the spatio-temporal and semantic features to obtain the feature matrix J, which integrates spatio-temporal and semantic information of the trajectory:

$$J = \beta_1 Z^1 + \beta_2 Z^2$$

and;

inputting the feature matrix J into a decoder to obtain the predicted trajectories $F=\{f_1, f_2, \ldots f_n\}$ for the vehicles surrounding the target vehicle where $$f=\{(X^i_{t+1}, Y^i_{t+1}), (X^i_{t+2}, Y^i_{t+2}) \ldots (X^i_{t+T_f}, y^i_{t+T_f})\}$$

represents a future trajectory of the vehicle i, and $T_f$ represents a preset future time window;

the Cro-IntentFormer-based method for predicting the surrounding vehicle trajectories by integrating the driving intentions, the method further including a prediction system, wherein the system further includes:

an information collection and processing device, comprising onboard sensors, roadside sensors, and a data processing module, wherein the information collection and processing device is configured for real-time acquisition of position and speed information of a host vehicle and surrounding vehicles, and performs standardization, cleaning, and preprocessing on the collected vehicle trajectory data to produce the raw data that meets input requirements of a surrounding vehicle trajectory prediction model; and the surrounding vehicle trajectory prediction model, comprising the spatio-temporal feature extraction module, the intent prediction module, a feature fusion module, and the decoder, wherein during vehicle operation, the surrounding vehicle trajectory prediction model explicitly considers the impact of the vehicle driving intentions on the future vehicle trajectories, and based on the raw data obtained from the information collection and processing device, predicts future trajectories of the surrounding vehicles;

the prediction system further comprising:

a hazard warning device configured to, based on the future trajectories predicted by the surrounding vehicle trajectory prediction model, issue warnings for vehicles that may pose a collision risk with a host vehicle's future path.

2. The Cro-IntentFormer-based method for predicting the surrounding vehicle trajectories by integrating the driving intentions according to claim 1, wherein the step S1 of preprocessing the vehicle trajectories comprises:

standardizing the vehicle trajectory data collected by onboard sensors, using timestamps and vehicle IDs to label trajectory information;

cleaning standardized vehicle trajectory data by removing anomalies and duplicates, filling missing values, and reducing noise in cleaned vehicle trajectory data;

annotating the trajectories with intentions based on the vehicle's heading angle and longitudinal/lateral speeds at each time step, where the behavioral intentions of the vehicles comprise going straight $a_1$, changing the lanes to the left $a_2$, and changing the lanes to the right $a_3$; and dividing processed vehicle trajectory data using a time window T, with divided vehicle trajectory data serving as a raw input for a model.

3. The prediction system according to claim 1, wherein in the Cro-IntentFormer-based method, the step S1 of preprocessing the vehicle trajectories comprises:

standardizing the vehicle trajectory data collected by onboard sensors, using timestamps and vehicle IDs to label trajectory information:

cleaning standardized vehicle trajectory data by removing anomalies and duplicates, filling missing values, and reducing noise in cleaned vehicle trajectory data;

annotating the trajectories with intentions based on the vehicle's heading angle and longitudinal/lateral speeds at each time step, where the behavioral intentions of the vehicles comprise going straight $a_1$, changing the lanes to the left $a_2$, and changing the lanes to the right as; and dividing processed vehicle trajectory data using a time window T, with divided vehicle trajectory data serving as a raw input for a model.

4. The prediction system according to claim 1, further comprising a hazard warning device configured to, based on the future trajectories predicted by the surrounding vehicle trajectory prediction model, issue warnings for vehicles that may pose a collision risk with a host vehicle's future path.

* * * * *